(12) United States Patent
Keren (10) Patent No.: US 8,511,585 B2
(45) Date of Patent: Aug. 20, 2013

(54) DRIP IRRIGATION EMITTER

(75) Inventor: Ron Keren, D.N. Negev (IL)

(73) Assignee: Netafim, Ltd., Tel Aviv (IL)

( * ) Notice: Subject to any disclaimer, the term of this patent is extended or adjusted under 35 U.S.C. 154(b) by 867 days.

(21) Appl. No.: 12/643,408

(22) Filed: Dec. 21, 2009

(65) Prior Publication Data
US 2010/0155508 A1   Jun. 24, 2010

Related U.S. Application Data (60) Provisional application No. 61/140,182, filed on Dec. 23, 2008.

(51) Int. Cl.
*B05B 15/00* (2006.01)

(52) U.S. Cl.
USPC ............... 239/542; 239/533.1; 239/533.13; 239/576

(58) Field of Classification Search
USPC ............ 239/542, 569–584, 533.1, 533.13; 137/500, 501, 503, 512.4
See application file for complete search history.

(56) References Cited

U.S. PATENT DOCUMENTS

| | | | | |
|---|---|---|---|---|
| 6,206,305 | B1 * | 3/2001 | Mehoudar | 239/542 |
| 6,250,571 | B1 * | 6/2001 | Cohen | 239/542 |
| 2005/0284966 | A1 * | 12/2005 | DeFrank | 239/542 |
| 2007/0194149 | A1 * | 8/2007 | Mavrakis et al. | 239/542 |
| 2009/0302127 | A1 * | 12/2009 | Lutzki et al. | 239/11 |

FOREIGN PATENT DOCUMENTS

WO   2007/046104   4/2007

* cited by examiner

*Primary Examiner* — Dinh Q Nguyen (74) *Attorney, Agent, or Firm* — Womble Carlyle (57) ABSTRACT

A drip irrigation emitter has first and second inlets through which liquid enters the emitter from an irrigation pipe, an outlet through which liquid exits the emitter, and a first flexible diaphragm portion seated on the second inlet and serving as a valve. Liquid at a pressure in the pipe that is below a predetermined level enters the emitter via the first inlet and travels along a first flow restricting path before exiting via the outlet and liquid at a pressure in the pipe that is above the predetermined level biases the first flexible diaphragm portion so that liquid can enter the emitter via the second inlet and travels along a second flow restricting path before exiting via the outlet.

20 Claims, 5 Drawing Sheets

DRIP IRRIGATION EMITTER

RELATED APPLICATIONS

The present application claims priority to U.S. Provisional Patent Application No. 61/140,182, filed 23 Dec. 2008. The contents of the aforementioned Provisional Application are incorporated by reference in their entirety.

BACKGROUND

1. Field of the Invention

The present disclosure relates to drip irrigation emitters that are used to control the provision of liquid to plants.

2. Background of the Invention

Such drip emitters are normally coupled to an irrigation pipe and are provided with an inlet, an outlet and a flow-restricting path therebetween. Liquid passing from the pipe via the inlet into the emitter; traverses through the flow-restricting path to be released at the outlet of the emitter at a relatively low discharge pressure generally equal to about zero.

In some drip emitters a flexible diaphragm is provided to control liquid flow so that it is substantially independent of inlet pressure. The diaphragm is usually located between the inlet and the outlet and is responsive to pressure of the entering liquid so that as the pressure of the entering liquid increases, the diaphragm undergoes distortion that operates to increase resistance to liquid flow through the dripper.

U.S. Pat. No. 6,302,338, the disclosure of which is incorporated herein by reference, describes a one-way valve in the form of a cap which permits water flow from an interior of a water supply tube towards a water discharge opening, but blocks water flow in the reverse direction. When the water pressure within the tube is above a predetermined minimum pressure, the water bearing against the inner side of the valve deforms the valve thereby permitting water flow past the valve. The water pressure at the outer side of the valve, which exhibits a slight drop in pressure in relation to the inner side of the valve, flows onwards via a pressure reducing labyrinth to be discharged at a water pressure substantially equal to zero via an opening in the water supply tube.

In emitters such as the one described above; when water passes the valve into the emitter, the water pressure immediately after the valve bears against the valve to restrict the flow of water that passes the valve.

U.S. Pat. No. 5,111,996, the disclosure of which is incorporated herein by reference, describes an emitter coupled to a conduit that has valves that are used to control the length of a fluid-flow-limiting passageway, such as a labyrinth. The emitter's labyrinth is divided into sections and a series of valves selectively force the fluid entering the labyrinth to flow through additional sections of the labyrinth as the pressure in the conduit rises.

SUMMARY

The following embodiment and aspects thereof are described and illustrated in conjunction with systems, tools and methods which are meant to be exemplary and illustrative, not limiting in scope.

In an aspect of the invention, a drip irrigation emitter comprises: a flow restricting path, first and second inlets through which liquid is adapted to enter the emitter from an irrigation pipe, an outlet through which liquid is adapted to exit the emitter to communicate with the outside environment, and a valve that seats on the second inlet, wherein when starting to irrigate and when liquid pressure in the pipe is below a predetermined level, a single liquid flow through the emitter is defined by liquid that enters the emitter via the first inlet to flow through the flow restricting path and exit the emitter via the outlet, and when liquid pressure in the pipe rises to above the predetermined level, the single liquid flow through the emitter is altered to be defined by liquid that biases the valve to enter the emitter via the second inlet and flow through a section of the flow restricting path to exit the emitter via the outlet.

Optionally, the section of the flow restricting path is defined between an intermediate portion and an end of the flow restricting path.

Optionally, the emitter comprises a reservoir that receives liquid that flows through the flow restricting path for regulating the flow of liquid that exits the emitter.

Optionally, the emitter comprises a diaphragm that bounds at least a portion of the reservoir and is adapted to be displaced into the reservoir to decrease the volume of the reservoir.

In addition to the exemplary aspects and embodiment described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The disclosure, however, both as to organization and method of operation, together with objects, features, and advantages thereof, may best be understood by reference to the following detailed description when read with the accompanying figures, in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 1:
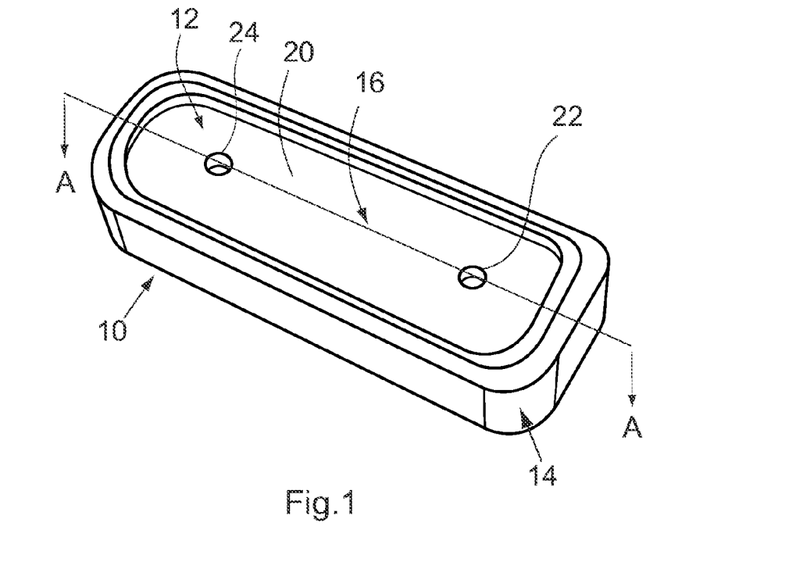
FIG. 1 shows a perspective top view of a drip emitter in accordance with embodiments of the present disclosure.
Figure 2:
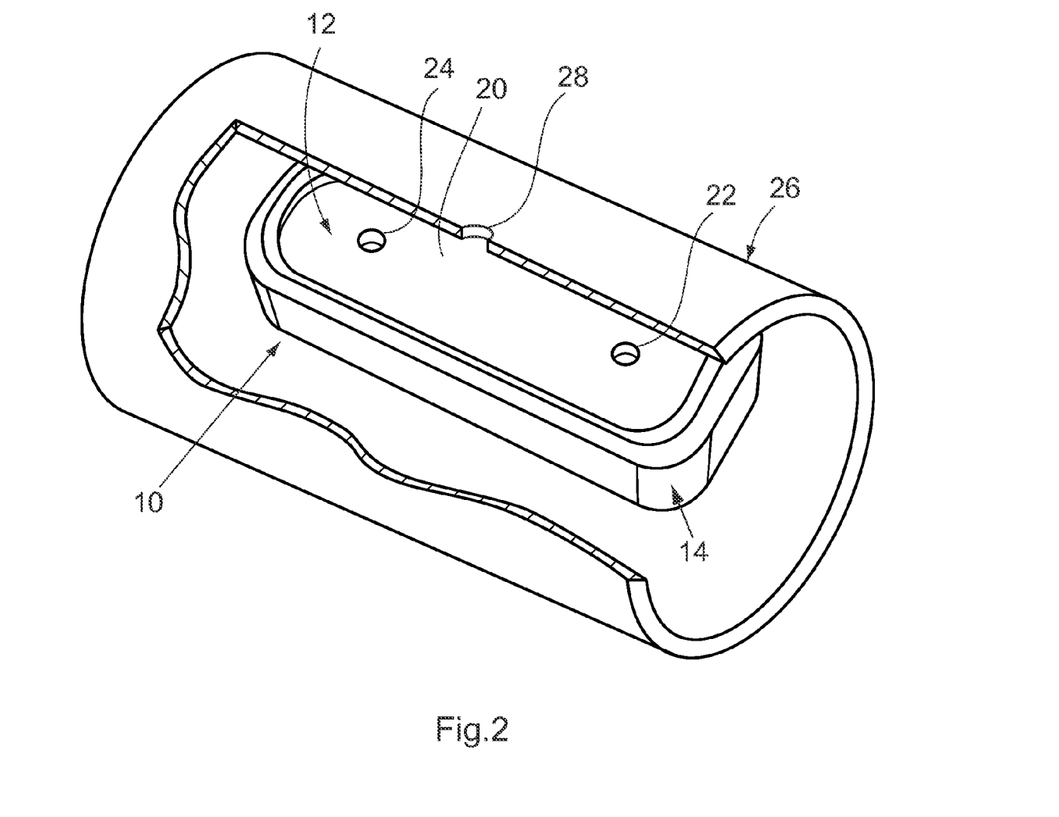
FIG. 2 shows the emitter shown in FIG. 1 mounted in an irrigation pipe.

Attention is first drawn to FIGS. 1 and 2. A drip irrigation emitter 10 in accordance with embodiments of the present disclosure has a cover 12 and a body 14 that form an outer shell of the emitter 10. The cover 12 has opposing upper and lower faces 16, 18 (only the upper face 16 is shown in FIGS. 1 and 2) and the upper face 16 has an upper recess 20 that is formed therein. Two bores 22, 24 extending between the upper and lower faces 16, 18 of the cover 12 open out at an upper side of the cover 12 into the upper recess 20, and the drip emitter 10 is adapted to attach to an inner face of an irrigation pipe 26 at its upper side. When attached to the pipe 26, the inner face of the pipe overlies the upper recess 20 and at least one perforation 28 that is formed in the pipe 26 provides fluid communication between the upper recess 20 and the outside environment.

The upper and lower directions used herein point respectively out of and into the pipe 26. Each part of the emitter 10, even when shown by itself, will be descried herein as in its orientation in the emitter 10 if the emitter 10 were to be attached to the pipe 26 and therefore in relation to the upper and lower directions. It should be noted that directional terms appearing throughout the specification and claims, e.g. "inner", "outer", "up", "down" etc., (and derivatives thereof) are for illustrative purposes only, and are not intended to limit the scope of the appended claims. In addition it is noted that the directional terms "down", "bottom", "below" and "lower" (and derivatives thereof) define in most cases identical directions and the directional terms "up", "above" (and derivatives thereof) define in most cases identical directions. Further more it is noted that in most cases in this disclosure, identical or nearly identical components that appear in different embodiments are represented by a similar numeral.

Figure 3:
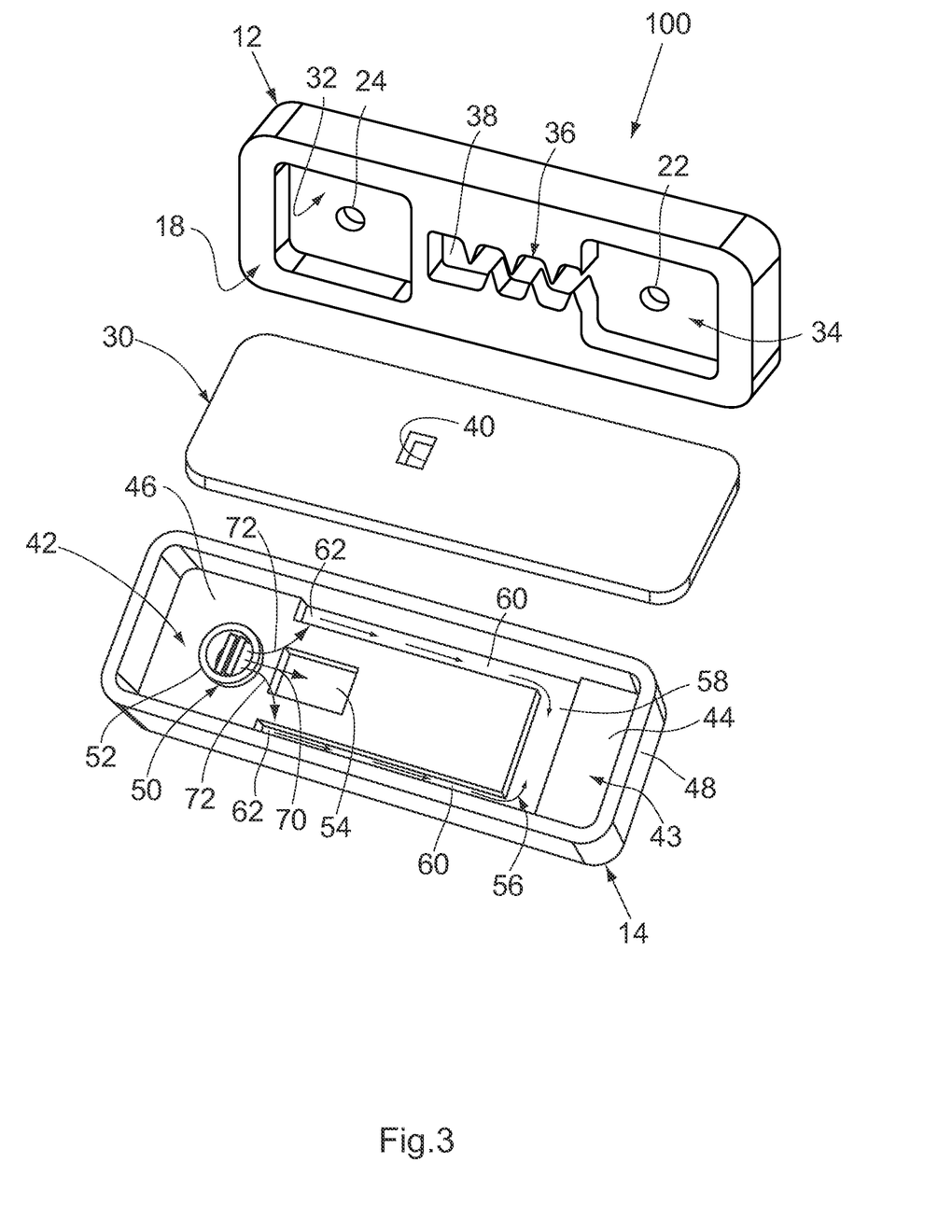
FIG. 3 shows an exploded view of a first embodiment of the emitter showing perspective top views of a cover and a flexible diaphragm of the emitter and a perspective bottom view of a body of the emitter.
Figure 4A:
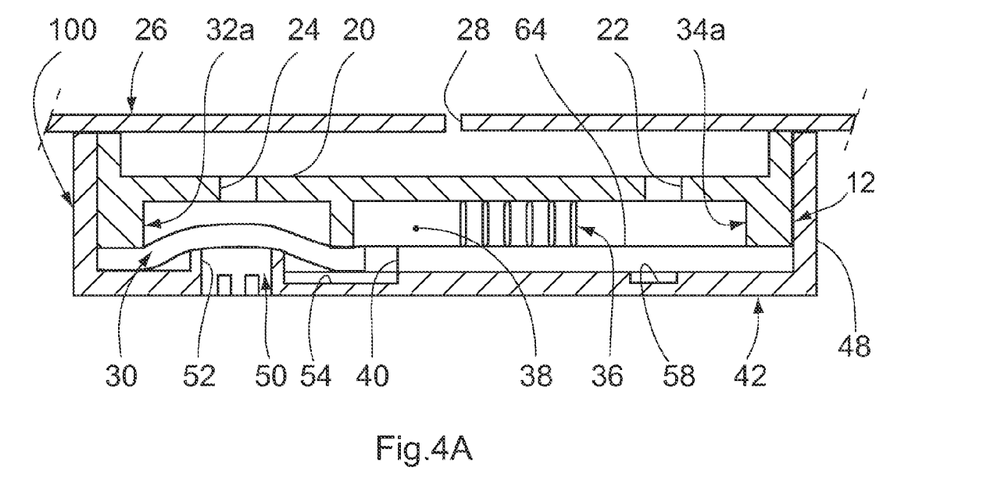
FIG. 4A shows a cross sectional view of the emitter in accordance with the first embodiment taken in plane A-A shown in FIG. 1 and showing the emitter in a non-operative state.
Figure 4B:
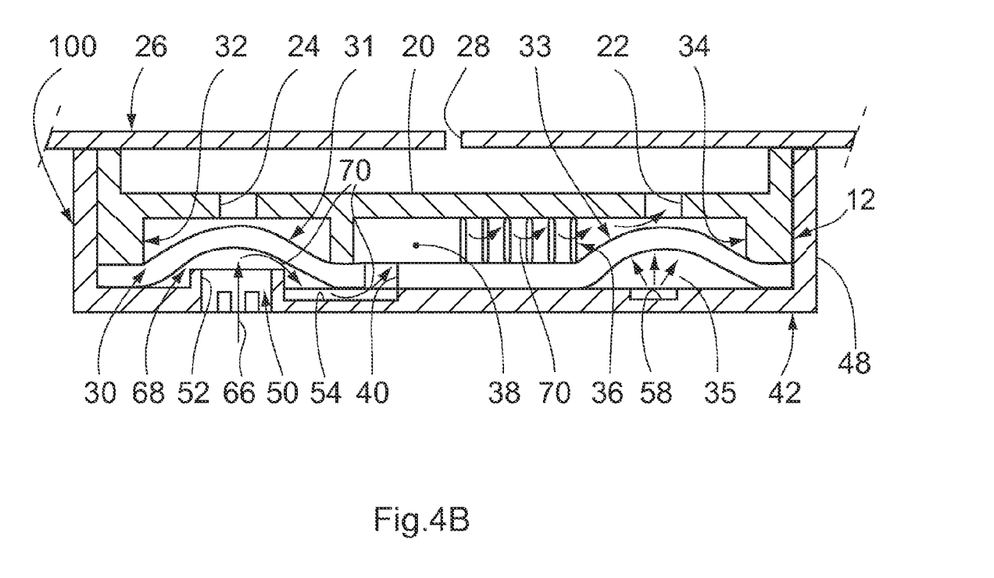
FIG. 4B shows a cross sectional view of the emitter in accordance with the first embodiment taken in plane A-A shown in FIG. 1 and showing the emitter in an operative state.

Attention is now drawn to FIGS. 3, 4A and 4B. A drip emitter 100 in accordance with a first embodiment of the present disclosure has a cover 12, a body 14 and a flexible diaphragm 30 therebetween. The flexible diaphragm 30 may, in one embodiment, comprise an elastic material. The lower face 18 of the cover 12 is formed having a chamber recess 32 a regulating reservoir recess 34 and a flow restricting labyrinth 36 that extends from a labyrinth entry 38 to the reservoir recess 34.

In the assembled emitter 100, as seen in FIGS. 4A and 4B, a first portion 31 of the flexible diaphragm 30 closes off the chamber recess 32 to thereby form a chamber 32a, and a second portion 33 closes off the open regulating reservoir recess 34, to thereby form a reservoir 34a.

One of the bores 24 in the cover 12 (hereinafter referred to as an airway) opens into the chamber 32a and provides fluid communication between the chamber 32a and the upper recess 20 on the upper side of the cover 12. The other bore 22 in the cover 12 (hereinafter referred to as an outlet) opens into the reservoir 34a and provides fluid communication between the reservoir 34a and the upper recess 20 on the upper side of the cover 12.

The flexible diaphragm 30 has upper and lower sides and a diaphragm hole 40 that is formed through the diaphragm 30 opens out at the upper and lower sides. The body 14 of the emitter 100 has in a top plan view a rectangular shaped base 42 that is elongated between first and second ends 44, 46. A peripheral side wall 48 of the body 14 extends upwardly from a periphery of the base 42 and defines a cavity 43. An inlet 50 formed adjacent the second end 46 of the base 42 extends between upper and lower sides of the base 42 and a raised rim 52 of the base 42 projects into the cavity 43 and circumscribes the inlet 50 at the upper side of the base 42.

The base 42 has in addition a concavity 54 and a channel 56 that are formed on its upper side. The concavity 54 extends away from the rim 52 towards the first end 44 of the base 42, and the channel 56 has a bridge section 58 and two leg sections 60. The leg sections 60 start to extend on both sides of the concavity 54 from respective beginnings 62 towards the first end 44 of the base 42 to be joined at the bridge 58. Each leg section 60 extends respectively upon the base 42 along an adjacent portion of the peripheral wall 48 while the bridge 58 extends upon the base 42 between those opposing portions of the peripheral wall 48 proximate the first end 44.

In the assembled emitter 100 in accordance with the first embodiment of the present invention, the cover 12 of the emitter 100 is located within the peripheral wall 48 of the body 14 with its chamber 32a being positioned above the inlet 50 of the base 42 and its reservoir 34a being positioned above the bridge 58 of the base 42. The flexible diaphragm 30 is pressed between the upper side of the base 42 and the lower face 18 of the cover 12 with its diaphragm hole 40 being positioned so that it opens into the concavity 54 of the base 42 and into the entry 38 of the labyrinth 36. By being pressed between the base 42 and the cover 12, the upper side of the diaphragm 30 forms a floor 64 located below the labyrinth 36, reservoir 34a and chamber 32a that cover and substantially seal the labyrinth 36, reservoir 34a and chamber 32a from below. The labyrinth 36 and reservoir 34a are kept in fluid communication with interior portions of the emitter 100 below the floor 64 via the diaphragm hole 40 while the chamber 32a is kept substantially sealed by the floor 64 from interior portions of the emitter 100. A portion of the diaphragm 30 that is located above the rim 52 is held pressed against the rim 52.

When starting to irrigate and when the pressure of liquid in the pipe 26 is below a predetermined threshold level (FIG. 4A), the portion of the diaphragm above the rim 52 is kept seated against the rim 52 and substantially seals the inlet 50 against ingress and egress of fluid respectively into and out of the emitter 100.

As pressure of the liquid in the pipe 26 rises to above a predetermined threshold level, the liquid bearing against the diaphragm 30 lifts the diaphragm 30 off of its seated position and upwardly away from the rim 52 and urges the diaphragm into the chamber 32a (FIG. 4B). It can therefore be seen from FIG. 4B that a first flexible portion 31 of the diaphragm 30 is associated with both the chamber 32a and the inlet 50. More particularly, the first flexible diaphragm portion 31 forms a boundary between the chamber 32a and the inlet 50 and effectively acts as a pressure-controlled valve for the inlet 50. The first flexible diaphragm portion 31 is formed of a material such that liquid entering the inlet 50 at a predetermined pressure urges the first flexible diaphragm portion 31 to deform and reduce a volume of the chamber 32a.

As the diaphragm 30 is lifted off the rim 52, liquid indicated by arrow 66 enters the emitter 100 via the inlet 50 and at least partially fills a space 68 formed between the rim 52 and the underside of the diaphragm 30 due to the liquid's pressure. The liquid 66 then is channeled into several paths within the emitter 100. One flow path indicated by arrows 70 enters the concavity 54 in the base 42 and then passes via the diaphragm hole 40 to the top side of the diaphragm 30 to enter the labyrinth 36 via its entry 38. The liquid flowing in this flow path 70 then traverses the labyrinth 36 to enter the reservoir 34a and then exits the emitter 100 via the outlet 22. Other liquid paths indicated by arrows 72 (see FIG. 3) eventually flow into the leg sections 60 of the channel 56 to thereby fill the leg and bridge sections 60, 58 of the channel 56.

When liquid flows through the emitter 100, the pressure of the liquid outside of the emitter 100 and inside the pipe 26 is transmitted via the inlet 50 and leg sections 60 of the channel 56 to the bridge 58 section of the channel located below the emitter's reservoir 34a. This pressure is illustrated in FIG. 4B by short arrows 35. An increase of liquid pressure in the pipe 26 may cause displacement of a portion of the diaphragm 30 that overlies the bridge section 58 into the reservoir 34a. Resistance to flow of liquid into the reservoir 34a from the labyrinth 36 and from the reservoir 34a into the upper recess 20 on the outer side of the cover 12 is a function of this displacement. As the displacement of the diaphragm 30 away from the base 42 and into the reservoir 34a is increased, this resistance is increased. As a result, the portion of the diaphragm 30 that is located above the bridge section 58 operates to regulate flow of liquid from the irrigation pipe 26 through emitter 100 and the flow rate of liquid exiting the emitter 100 is substantially independent of inlet pressure for a given pressure range for which the emitter 100 is designed to operate. Thus, a second flexible portion 33 of the diaphragm 32 is associated with the reservoir 34a. More particularly, the second flexible portion 33 forms a boundary of the reservoir 34a. The second flexible diaphragm portion 33 is formed of a material such that liquid entering the inlet 50 at a predetermined pressure urges the second flexible diaphragm portion 33 to deform and reduce a volume of the reservoir 34a.

In the embodiments shown, the first flexible diaphragm portion 31 and the second flexible diaphragm portion 33 belong to a common diaphragm 30 which has unitary one-piece construction. It should be understood, however, that the portions 31, 33 may instead belong to separate pieces of diaphragm material.

By way of an example, an emitter 100 in accordance with an embodiment of the present disclosure may have a predetermined threshold level of 4 meters of water head for the lifting of the diaphragm 30 from the rim 52 and may be designed to exhibit a flow rate that is substantially independent of inlet pressure in a range of between 6 to 10 meters of water head.

Due to the fact that the chamber 32a is in fluid communication via the airway 24 with the exterior of the emitter, and hence the outside environment, the pressure of fluid in the chamber 32a is substantially equal to that of the outside environment. As a result, liquid entering the emitter 100 via the inlet 50 is only required to overcome the local rigidity of the diaphragm 30 seated on the rim 52 in order to enter the emitter 100. The upper side of the diaphragm 30 that seats on the rim 52 is exposed to the chamber 32a, which has a pressure substantially equal to that of the outside environment, and not to any portion of the liquid flowing through the emitter 100 which typically exhibits a liquid pressure above that of the outside environment. Any pressure above that of the outside environment which may be imposed upon the upper side of the diaphragm 30 may bear against the diaphragm 30 to restrict the flow of liquid entering the emitter 100.

Figure 5:
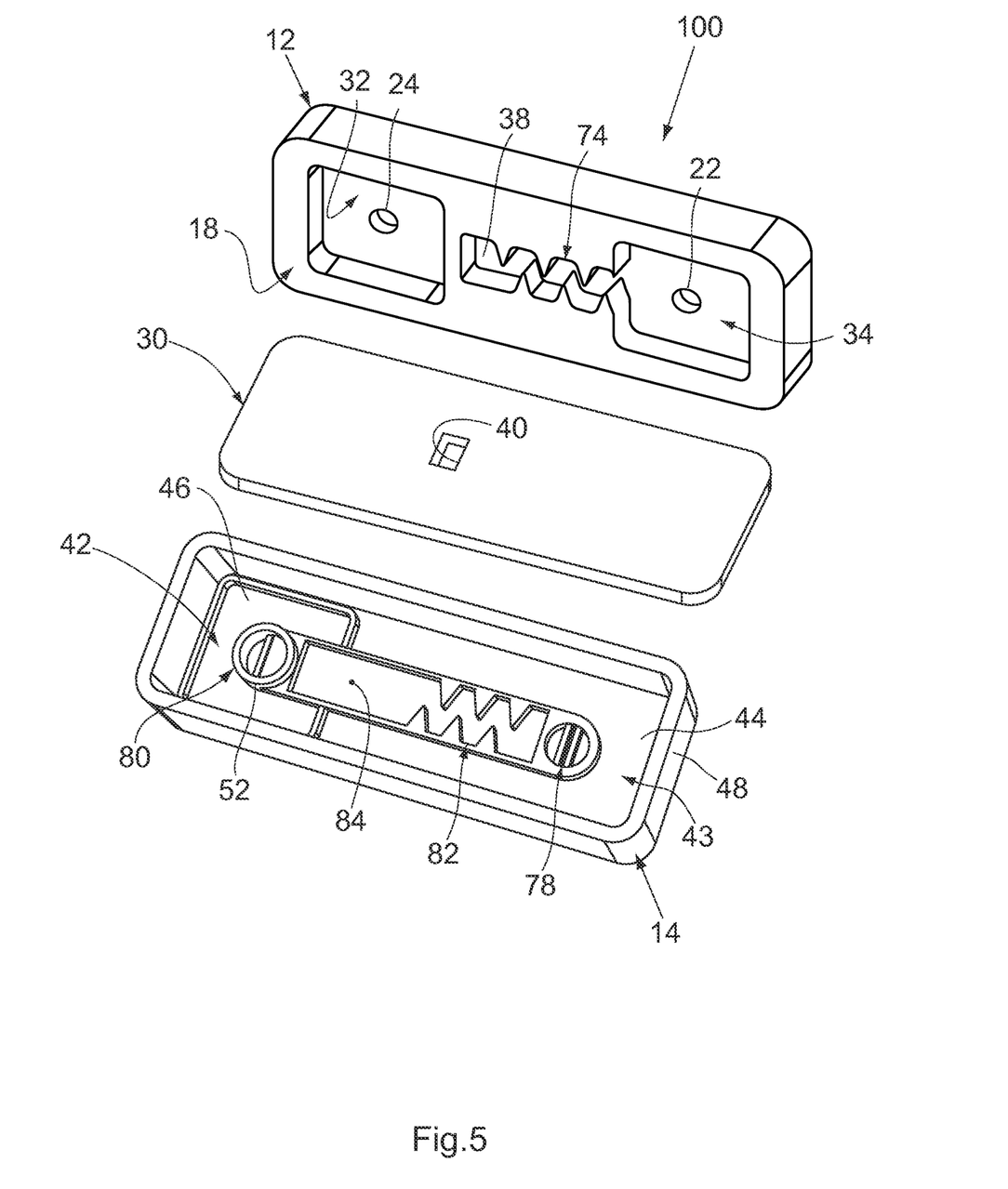
FIG. 5 shows an exploded view of a second embodiment of the emitter showing perspective top views of a cover and a flexible diaphragm of the emitter and a perspective bottom view of a body of the emitter.
Figure 6A:
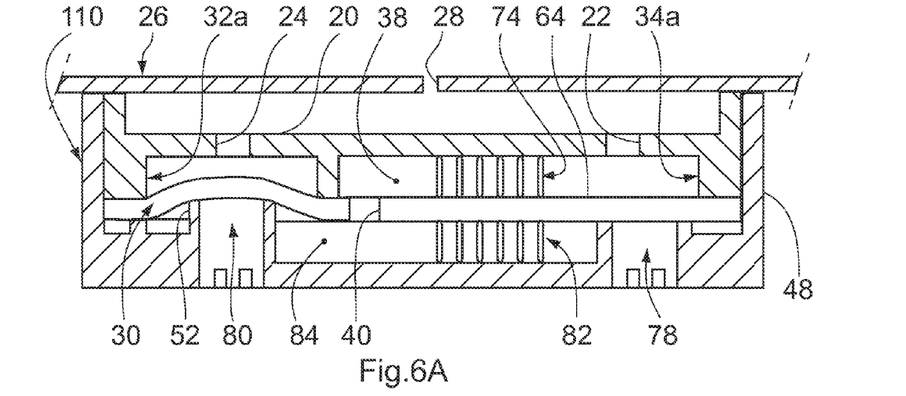
FIG. 6A shows a cross sectional view of the emitter in accordance with the second embodiment taken in plane A-A shown in FIG. 1 and showing the emitter in a non-operative state.
Figure 6B:
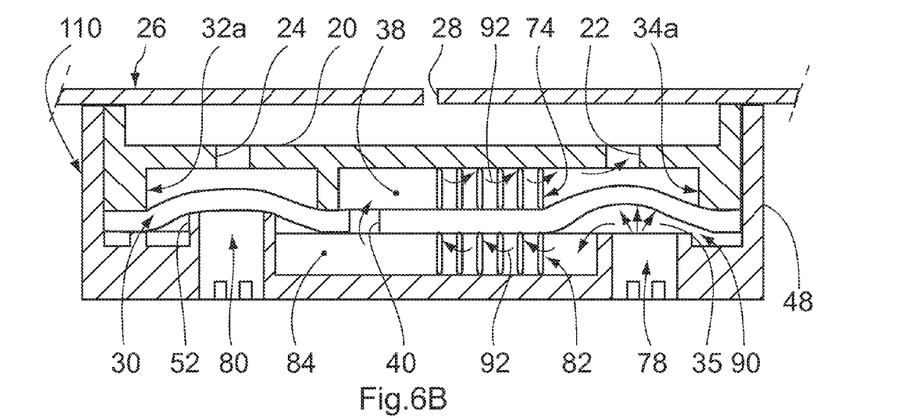
FIG. 6B shows a cross sectional view of the emitter in accordance with the second embodiment taken in plane A-A shown in FIG. 1 and showing the emitter in a first operative state.

Attention is now drawn to FIGS. 5 and 6A to 6B. A drip emitter 110 in accordance with a second embodiment of the present disclosure has a cover 12, a body 14 and a flexible diaphragm 30 therebetween. The lower face of the cover 18 is formed having a chamber recess 32, a regulating reservoir recess 34 and an upper flow restricting labyrinth 74 that extends from a labyrinth entry 38 to the reservoir recess 34. The airway 24 that is formed in the cover 12 opens into the chamber recess 32 and, in the assembled emitter 110, provides fluid communication between the chamber 32a and the upper recess 20 on the upper side of the cover 12. The outlet 22 that is formed in the cover 12 opens into the reservoir 34a and provides fluid communication between the reservoir 34a and the upper recess 20 on the upper side of the cover 12.

The flexible diaphragm 30 has upper and lower sides; a diaphragm hole 40 that is formed through the diaphragm 30 opens out at the upper and lower sides. The body 14 of the emitter 110 has in a top plan view a rectangular shaped base 42 that is elongated between first and second ends 44, 46 and a peripheral side wall 48 of the body 14 extends upwardly from a periphery of the base 42 and defines a cavity 43.

Drip emitter 110 has first and second inlets 78, 80 which are formed respectively adjacent the first and second ends 44, 46 of the base 42 and extend between the upper and lower sides of the base 42. A raised rim 52 of the base 42 circumscribes the second inlet 80 at the upper side of the base 42 and protrudes into the cavity 43. In the description hereinbelow, the emitter 110 in accordance with the second embodiment will be described with the two inlets 78, 80. It is noted, however, that additional inlets may be provided in the emitter 110.

The base 42 has in addition a lower flow restricting labyrinth 82 that is formed in the base 42 and extends between a cranny 84 of the lower labyrinth 82 adjacent the second inlet 80 to a location adjacent the first inlet 78. In the assembled emitter 110, the cover 12 is located within the peripheral wall 48 of the body 14, the chamber 32a is positioned above the second inlet 80 and the reservoir 34a is positioned above the first inlet 78. The flexible diaphragm 30 is pressed between the upper side of the base 42 and the lower face 18 of the cover 12 with the diaphragm hole 40 being positioned so that it opens into the cranny 84 of the lower labyrinth 82 and into the entry 38 of the upper labyrinth 74. In other words, in drip emitter 110, the diaphragm hole 40 forms a passageway between the lower labyrinth 82 and the upper labyrinth 74.

By being pressed between the base 42 and the cover 12, the upper side of the diaphragm 30 forms a floor 64 below the upper labyrinth 74, reservoir recess 34 and chamber recess 32 that covers and substantially seals the upper labyrinth 74, reservoir 34a and chamber 32a from below. The upper labyrinth 74 and reservoir 34a are kept in fluid communication with interior portions of the emitter 110 below the floor 64 via the diaphragm hole 40 while the chamber 32a is kept substantially sealed by the floor 64 from interior portions of the emitter 110. The portion of the diaphragm 30 that defines the floor 64 below the upper labyrinth 74 may also be considered to define a roof 86 for the lower labyrinth 82 that covers and substantially seals the lower labyrinth 82 from above. The portion of the diaphragm 30 that is located above the rim 52 is pressed against the rim 52.

Before liquid flows through the pipe 26 and irrigation is started (FIG. 6A), the portion of the diaphragm 30 above the rim 52 is kept seated against the rim 52 and substantially seals the second inlet 80 against ingress and egress of fluid respectively into and out of the emitter 110.

As liquid flows through the pipe 26 and while the pressure of liquid in the pipe 26 is below a first predetermined threshold level (FIG. 6B), the emitter 110 enters its first mode of operation. In the first mode of operation, the portion of the diaphragm 30 above the rim 52 is still kept seated against the rim 52. However, a portion of the diaphragm 30 that is located above the first inlet 78 lifts up and liquid flows into the emitter 110 via the first inlet 78 and at least partially fills a first space 90 formed between the diaphragm 30 and that portion of the base 42 in which the first inlet 78 is formed.

In this first mode of operation, the liquid then follows a first flow path through the emitter indicated by arrows 92. Liquid taking this first flow path 92 traverses through the lower labyrinth 82 in the base 42, enters into the cranny 84 and then passes via the diaphragm hole 40 to the other side of the diaphragm 30 to enter the upper labyrinth 74 via its entry 38. The liquid then traverses the upper labyrinth 74 to enter the reservoir 34a and then exits the emitter 110 via the outlet 22.

Figure 6C:
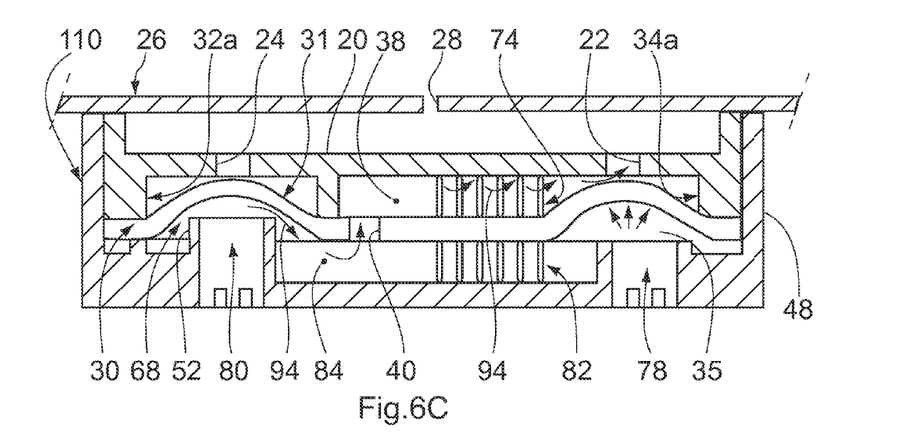
FIG. 6C shows a cross sectional view of the emitter in accordance with the first embodiment taken in plane A-A shown in FIG. 1 and showing the emitter in a second operative state.

As the pressure of the liquid in the pipe 26 rises above the first predetermined threshold level, the emitter 110 enters its second mode of operation. In this second mode of operation, the liquid bearing against the diaphragm 30 at the second inlet 80 lifts the diaphragm 30 upwardly away from the rim 52 and urges the diaphragm 30 into the chamber 32a (FIG. 6C). It can therefore be seen from FIG. 6C that a first flexible portion 31 of the diaphragm 30 is associated with both the chamber 32a and the second inlet 80. More particularly, the first flexible diaphragm portion 31 forms a boundary between the chamber 32a and the second inlet 80, and effectively acts as a pressure-controlled valve for the second inlet 80. Liquid entering the second inlet 80 at a predetermined pressure urges the first flexible diaphragm portion 31 to deform and reduce a volume of the chamber 32a.

The liquid enters the emitter 110 via the second inlet 80 and at least partially fills a second space 68 formed between the rim 52 and the underside of the diaphragm 30 due to the liquid's pressure. The liquid then follows a second flow path indicated by arrows 94. Liquid taking this second flow path 94 enters the cranny 84 in the base 42 and then passes via the diaphragm hole 40 to the other side of the diaphragm 30 to enter the upper labyrinth 74 via its entry 38. The liquid then traverses the upper labyrinth 74 to enter the reservoir 34a and then exits the emitter 110 via the outlet 22.

In the emitter's first mode of operation, the flow rate of liquid exiting the emitter 110 is mainly determined by the resistance to liquid flow provided by the upper and lower labyrinths 74, 82. However, in the emitter's second mode of operation, the liquid entering the emitter 110 via second inlet 80 follows a flow path 94 with less resistance, since the resistance is provided only by the upper labyrinth 74.

Therefore, the emitter 110 in accordance with the second embodiment of the present invention has two modes of operation. The first mode is characterized by a single liquid flow path 92 flowing through the emitter 110 that has a first regulated flow rate and the second mode is characterized by a single liquid flow path 94 flowing through the emitter 110 that has a second regulated flow rate which is higher than the first flow rate. The first mode of operation comes into effect at a liquid pressure in the pipe above zero and below the first predetermined threshold level, and the second mode of operation comes into effect at a liquid pressure in the pipe above the first predetermined threshold level.

It is noted, however, that an optional raised rim (not shown) on which the diaphragm rests may also be provided around the first inlet 78. In such case, the first mode of operation may come into effect at a pressure level in the pipe that, for example, is above zero and below the predetermined threshold level.

When liquid flows through the emitter 110, the pressure of the liquid outside of the emitter 110 and inside the pipe 26 is transmitted via the first inlet 78 onto the portion of the diaphragm 30 located above the first inlet 78. This pressure is illustrated in FIGS. 6B and 6C by short arrows 35. An increase of liquid pressure in the pipe 26 may cause displacement of the portion of the diaphragm that overlies the first inlet 78 into the reservoir 34a. As already described hereinabove, resistance to flow of liquid into the reservoir 34a from the upper labyrinth 74 and from the reservoir 34a into the upper recess 20 on the outer side of the cover 12 is a function of this displacement. As the displacement of the diaphragm 30 away from the base 42 and into the reservoir 34a is increased, this resistance is also increased. As a result, the portion of the diaphragm 30 that is located above the first inlet 78 regulates flow of liquid from the irrigation pipe 26 through emitter 110 and the first and second flow rates of liquid exiting the emitter 110 are substantially independent of inlet pressure for a given pressure range for which the emitter 110 is designed to operate.

In both emitters 100, 110, the chamber 32a is outside the (i.e., does not belong to) the liquid flow paths 70, 92 and 94. However, in both emitters, the reservoir 34a does belong to the liquid flow paths 70, 92 and 94 and is downstream from (i.e., closer to the outlet than) the labyrinths 36, 74 and 82. Finally, it is also noted that in both emitters, the pressure of the liquid causes the diaphragm 30 to lift, thereby allowing liquid flow through the inlets 50, 78, and 80.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although the present embodiment has been described to a certain degree of particularity, it should be understood that various alterations and modifications could be made without departing from the scope of the disclosure as hereinafter claimed.

What is claimed is:

1. A drip irrigation emitter comprising:
An elongated base having first and second ends;
first and second inlets through which liquid may enter the emitter, the first and second inlets formed respectively adjacent the first and second ends of the base and extending between upper and lower sides of the base;
at least one outlet through which liquid may exit the emitter;
a first flow path between the first inlet and the at least one outlet;
a second flow path between the second inlet and the at least one outlet; and
a first flexible diaphragm portion associated with the second inlet.

2. The drip irrigation emitter according to claim 1, wherein: the first and second flow paths at least partially overlap.

3. A drip irrigation emitter comprising:
first and second inlets through which liquid may enter the emitter;
at least one outlet through which liquid may exit the emitter;
a first flow path between the first inlet and the at least one outlet;
a second flow path between the second inlet and the at least one outlet; and
a first flexible diaphragm portion associated with the second inlet;
wherein:
the first and second flow paths at least partially overlap;
the first flow path comprises first and second flow restricting labyrinths; and
the second flow path comprises only the second of said first and second flow restricting labyrinths.

4. A drip irrigation emitter comprising:
first and second inlets through which liquid may enter the emitter;
at least one outlet through which liquid may exit the emitter;
a first flow path between the first inlet and the at least one outlet;
a second flow path between the second inlet and the at least one outlet;
a first flexible diaphragm portion associated with the second inlet; and
at least one reservoir formed in the emitter and in fluid communication with an exterior of the emitter, said at least one reservoir being part of both of said first and second flow paths.

5. The drip irrigation emitter according to claim 4, wherein:
the first flow path comprises first and second flow restricting labyrinths;
the second flow path comprises only the second of said first and second flow restricting labyrinths; and
the at least one reservoir is downstream of both the first and second flow restricting labyrinths.

6. The drip irrigation emitter according to claim 4, further comprising:
a second flexible diaphragm portion which forms a boundary of the at least one reservoir and is associated with the first inlet.

7. The drip irrigation emitter according to claim 6, wherein:
the first flexible diaphragm portion and the second flexible diaphragm portion belong to a common diaphragm having unitary one-piece construction.

8. The drip irrigation emitter according to claim 6, wherein:
the first flexible diaphragm portion is formed of a material such that liquid entering the second inlet at a predetermined pressure urges said first flexible diaphragm portion to deform and reduce a volume of at least one chamber formed in the emitter, which chamber is outside of the first and second flow paths; and
the second flexible diaphragm portion is formed of a material such that liquid entering the first inlet at a predetermined pressure urges the second flexible diaphragm portion to deform and reduce a volume of the reservoir.

9. A drip irrigation emitter in combination with an irrigation pipe, wherein:
the drip irrigation emitter comprises:
first and second inlets through which liquid may enter the emitter;
at least one outlet through which liquid may exit the emitter;
a first flow path between the first inlet and the at least one outlet;
a second flow path between the second inlet and the at least one outlet; and
a first flexible diaphragm portion associated with the second inlet;
the drip irrigation emitter is mounted in said irrigation pipe;
when a liquid pressure in the irrigation pipe is below a first predetermined level, liquid enters the emitter via the first inlet and travels along the first flow path to the at least one outlet, and
when a liquid pressure in the irrigation pipe is above said first predetermined level, liquid enters the emitter via the second inlet and travels along the second flow path to the at least one outlet.

10. A drip irrigation emitter comprising:
first and second inlets through which liquid is adapted to enter the emitter from an irrigation pipe,
an outlet through which liquid is adapted to exit the emitter to communicate with the outside environment, and
a first flexible diaphragm portion seated on the second inlet and serving as a valve, wherein
when liquid pressure is below a predetermined level, liquid enters the emitter via the first inlet and travels along a first flow restricting path before exiting via the outlet, and
when liquid pressure is above the predetermined level, the first flexible diaphragm portion is biased so that liquid enters the emitter via the second inlet and travels along a second flow restricting path before exiting via the outlet.

11. The drip irrigation emitter according to claim 10, wherein:
the first flow restricting path is longer than the second flow restricting path; and
the first and second flow restricting paths have overlapping portions.

12. The drip irrigation emitter according to claim 10, further comprising:
a reservoir that receives liquid that flows through either flow restricting path, for regulating the flow of liquid that exits the emitter.

13. The drip irrigation emitter according to claim 12, further comprising:
a second flexible diaphragm portion forming a boundary of the reservoir, the second flexible diaphragm portion being adapted to be displaced into the reservoir to decrease the volume of the reservoir.

14. The drip irrigation emitter according to claim 13, further comprising:
at least one chamber formed in the emitter and in fluid communication with an exterior of the emitter, said at least one chamber being outside of the first and second flow restricting paths, wherein:
the first flexible diaphragm portion forms a boundary of the at least one chamber.

15. The drip irrigation emitter according to claim 10, further comprising:
at least one chamber formed in the emitter and in fluid communication with an exterior of the emitter, said at least one chamber being outside of the first and second flow restricting paths, wherein:
the first flexible diaphragm portion forms a boundary of the at least one chamber.

16. The drip irrigation emitter according to claim 11, further comprising:
at least one chamber formed in the emitter and in fluid communication with an exterior of the emitter, said at least one chamber being outside of the first and second flow restricting paths, wherein:
the first flexible diaphragm portion forms a boundary of the at least one chamber.

17. The drip irrigation emitter according to claim 12, further comprising:
at least one chamber formed in the emitter and in fluid communication with an exterior of the emitter, said at least one chamber being outside of the first and second flow restricting paths, wherein:
the first flexible diaphragm portion forms a boundary of the at least one chamber.

18. The drip irrigation emitter according to claim 3, further comprising:
at least one chamber formed in the emitter and in fluid communication with an exterior of the emitter, said at least one chamber being outside of the first and second flow paths, wherein:

the first flexible diaphragm portion forms a boundary of the at least one chamber.

19. The drip irrigation emitter according to claim 4, further comprising:
- at least one chamber formed in the emitter and in fluid communication with an exterior of the emitter, said at least one chamber being outside of the first and second flow paths, wherein:
- the first flexible diaphragm portion forms a boundary of the at least one chamber.

20. The drip irrigation emitter according to claim 9, further comprising:
- at least one chamber formed in the emitter and in fluid communication with an exterior of the emitter, said at least one chamber being outside of the first and second flow paths, wherein:
- the first flexible diaphragm portion forms a boundary of the at least one chamber.

* * * * *